United States Patent
Ying et al.

(10) Patent No.: US 11,639,445 B2
(45) Date of Patent: May 2, 2023

(54) HIGH-HAZE ANTI-GLARE FILM AND HIGH-HAZE ANTIGLARE ANTI-REFLECTION FILM

(71) Applicant: BenQ Materials Corporation, Taoyuan (TW)

(72) Inventors: Che-Yu Ying, Taoyuan (TW); Yu-Wei Tu, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 0 days.

(21) Appl. No.: 17/567,264

(22) Filed: Jan. 3, 2022

(65) Prior Publication Data

US 2023/0086813 A1  Mar. 23, 2023

(30) Foreign Application Priority Data

Sep. 17, 2021 (TW) .................................. 110134901

(51) Int. Cl.
| | |
|---|---|
| G02B 1/111 | (2015.01) |
| C09D 5/00 | (2006.01) |
| C09D 7/61 | (2018.01) |
| C09D 7/40 | (2018.01) |
| C09D 7/65 | (2018.01) |
| C09D 133/14 | (2006.01) |
| C08J 7/04 | (2020.01) |
| C08J 5/18 | (2006.01) |
| C09D 7/47 | (2018.01) |
| G02B 1/14 | (2015.01) |
| G02F 1/1335 | (2006.01) |

(52) U.S. Cl.
CPC ............... *C09D 5/006* (2013.01); *C08J 5/18* (2013.01); *C08J 7/0427* (2020.01); *C09D 7/47* (2018.01); *C09D 7/61* (2018.01); *C09D 7/65* (2018.01); *C09D 7/69* (2018.01); *C09D 7/70* (2018.01); *C09D 133/14* (2013.01); *G02B 1/111* (2013.01); *G02B 1/14* (2015.01); *G02F 1/133504* (2013.01); *C08J 2301/12* (2013.01); *C08J 2433/14* (2013.01)

(58) Field of Classification Search
CPC .. G02B 1/11; G02B 1/111; G02B 1/14; G02B 1/18; G02B 5/02; G02B 5/0205; G02B 5/021–0231; G02B 5/0236–0247; G02B 5/0273–0294; G02B 6/0036; G02B 6/004–0043; G02F 1/133504; G02F 1/133504; C09D 135/02; C09D 175/14; B32B 27/00; B32B 27/06; B32B 27/08; B32B 27/30; B32B 27/308
See application file for complete search history.

(56) References Cited

U.S. PATENT DOCUMENTS

| | | | | |
|---|---|---|---|---|
| 2004/0160673 | A1* | 8/2004 | Se ................. | G02B 5/0221 359/615 |
| 2005/0063062 | A1* | 3/2005 | Ito ................. | G02B 5/0294 359/599 |
| 2005/0152034 | A1* | 7/2005 | Matsunaga ...... | G02B 5/0226 359/488.01 |
| 2006/0215079 | A1* | 9/2006 | Suzuki ............ | G02F 1/133502 349/96 |
| 2007/0206283 | A1* | 9/2007 | Ohtani ............ | G02B 1/111 359/488.01 |
| 2007/0231566 | A1* | 10/2007 | Yoneyama ...... | G02B 1/14 427/407.1 |
| 2008/0112055 | A1* | 5/2008 | Aro ................ | G02B 5/0226 359/599 |
| 2008/0286527 | A1* | 11/2008 | Haga .............. | G02B 5/0226 451/36 |
| 2009/0080081 | A1* | 3/2009 | Inoeu ............. | G02B 5/0278 359/601 |
| 2009/0096963 | A1* | 4/2009 | Takeda ........... | C08K 5/43 349/96 |
| 2009/0244710 | A1* | 10/2009 | Tsuno ............. | G02B 1/105 359/601 |
| 2009/0310219 | A1* | 12/2009 | Nagahama ...... | G02B 5/0278 359/488.01 |

(Continued)

FOREIGN PATENT DOCUMENTS

| | | | |
|---|---|---|---|
| CN | 111366994 A | 7/2020 | |
| JP | 2010060925 A | 3/2010 | |
| JP | 6100876 B1 * | 3/2017 | ............... C08J 5/18 |
| TW | 201426030 A | 7/2014 | |
| WO | 2019221000 A1 | 11/2019 | |
| WO | WO-2020111176 A1 * | 6/2020 | ............... G02B 1/11 |
| WO | WO-2021157664 A1 * | 8/2021 | |

OTHER PUBLICATIONS

Machine translation of JP 6100876B (Year: 2023).*

(Continued)

*Primary Examiner* — Z. Jim Yang

(57) ABSTRACT

A high-haze anti-glare film is disclosed. The high-haze anti-glare film comprises a transparent substrate and an anti-glare layer on the substrate. The anti-glare layer comprises acrylate binder, amorphous silica microparticles and spherical organic polymer microparticles, wherein the spherical organic polymer microparticles are monodispersity and the average particle size thereof is smaller than that of the amorphous silica microparticles. The total haze (Ht) of the anti-glare film is more than 40%, and the total haze is the sum of the surface haze (Hs) and the inner haze (Hi) of the anti-glare film, and the inner haze (Hi) and the total haze (Ht) satisfy the relation $0.25 < Hi/Ht < 0.75$. The present high-haze anti-glare film provides high anti-glare and anti-sparkling properties.

15 Claims, No Drawings

(56) References Cited

U.S. PATENT DOCUMENTS

| | | | |
|---|---|---|---|
| 2010/0003459 A1* | 1/2010 | Ohishi | B32B 27/08 428/147 |
| 2010/0033652 A1* | 2/2010 | Yamashita | G02B 5/0294 264/1.36 |
| 2010/0079867 A1* | 4/2010 | Wakizaka | G02B 5/0221 359/601 |
| 2010/0079868 A1* | 4/2010 | Asakura | G02B 5/0268 359/586 |
| 2010/0238558 A1* | 9/2010 | Im | G02B 1/118 524/502 |
| 2010/0245715 A1* | 9/2010 | Watanabe | G02B 5/02 359/488.01 |
| 2011/0249337 A1* | 10/2011 | Ohashi | G02B 5/0278 359/599 |
| 2012/0008206 A1* | 1/2012 | Haga | G02B 5/0221 428/206 |
| 2012/0213968 A1* | 8/2012 | Hosoda | G02B 6/0051 428/338 |
| 2014/0146454 A1* | 5/2014 | Nozawa | G02B 5/0263 361/679.01 |
| 2014/0340755 A1* | 11/2014 | Eguchi | G02B 5/0242 359/601 |
| 2015/0260882 A1* | 9/2015 | Furui | G02B 5/0221 345/173 |
| 2016/0216413 A1* | 7/2016 | Naismith | G02B 5/0221 |
| 2016/0259115 A1* | 9/2016 | Kitano | G02B 5/0242 |
| 2017/0276840 A1* | 9/2017 | Horio | B32B 27/00 |
| 2018/0251398 A1* | 9/2018 | Ikegami | C03C 17/25 |
| 2018/0252848 A1* | 9/2018 | Ludemann | G02B 5/0242 |
| 2020/0166677 A1 | 5/2020 | Sugawara | |
| 2021/0255364 A1* | 8/2021 | Yabuta | G02B 1/11 |
| 2021/0263193 A1 | 8/2021 | Chen et al. | |

OTHER PUBLICATIONS

Machine translation of WO 2020/111176 A1 (Year: 2023).*
Machine translation of WO 2021/157664 A1 (Year: 2023).*
Tosoh-Silica-Precipitated-Silica-Brochure.

* cited by examiner

HIGH-HAZE ANTI-GLARE FILM AND HIGH-HAZE ANTIGLARE ANTI-REFLECTION FILM

CROSS-REFERENCE TO RELATED APPLICATION

This application claims the priority benefit of Taiwanese Application Ser. No. 110134901, filed on Sep. 17, 2021, which is incorporated herein by reference.

TECHNICAL FILED

The present invention relates to a high-haze anti-glare film for a display, and more particularly to an anti-glare film with an anti-sparkling property.

BACKGROUND OF THE INVENTION

At known displays, such as liquid crystal display (LCD) or organic light-emitting diode displays (OLED), the glare caused by the external light incident on the display surface will affect the display quality, especially on the high-resolution displays with a high pixel density (e.g., more than 100 PPI (pixel per inch)), an anti-glare film can be applied to the surface of display to reduce the glare caused by the reflection of external light and the image sparkling. It has been proposed an anti-glare films with dispersed particles on a transparent substrate to provide a concave-convex surface to reduce the glare. However, the hemispherical convex of the concave-convex surface formed by the spherical particles leads to sparkling caused by the pixel light source emitted from the LC panel due to the zooming of the lens effect. In the state of the art, the lens effect can be eliminated by decreasing the particle size of the spherical particles of the film surface for reducing the sparkling, but the anti-glare property of the film would be reduced simultaneously. The increasing particle size of the spherical particles can improve the anti-glare property of the film, but the sparkling will be increased due to the increased lens effect. It is also suggested to increase the inner haze of the anti-glare layer in order to make the pixel light source scatter when going through the anti-glare layer to reduce the sparkling phenomenon. However, the increased spherical particles amount in the anti-glare layer for increasing the inner haze thereof will also increase the external haze of the surface and the amount of the hemispherical convex thereof, the sparkling phenomenon resulted from the lens effect will increased accordingly. At the same time, for preventing the particles from protruding to the layer surface to induce the lens effect, the thickness of the anti-glare layer needs to be increased to reduce the external haze of the surface, but in this way, the anti-glare property of the anti-glare layer will be insufficient.

The present invention is to provide a high-haze anti-glare film with anti-sparkling property, the anti-glare of which is enhanced to be no glare and the sparkling resulted from the lens effect thereof is effectively eliminated. The present high-haze anti-glare film is particularly suitable for a display with high pixel density (e.g., more than 100 PPI).

SUMMARY OF THE INVENTION

An aspect of the present invention is to provide a high-haze anti-glare film having a high anti-glare property, and an anti-sparkling property when used in a display with a high pixel density (e.g., more than 100 PPI).

The present high-haze anti-glare film comprises a transparent substrate and an anti-glare layer formed on the transparent substrate, wherein the anti-glare layer comprises an acrylate binder resin, a plurality of amorphous silica microparticles and a plurality of spherical organic microparticles, wherein the spherical organic microparticles are monodispersity and the average particle size thereof is less than the average particle size of the amorphous silica microparticles; wherein the total haze (Ht) of the anti-glare film is more than 40%, and the total haze is the sum of the surface haze (Hs) and the inner haze (Hi) of the anti-glare film, and the inner haze (Hi) and the total haze (Ht) satisfy the relation $0.25 < Hi/Ht < 0.75$.

The present high-haze anti-glare film comprises a transparent substrate and an anti-glare layer formed on the transparent substrate, wherein the anti-glare layer comprising an acrylate binder resin, a plurality of amorphous silica microparticles and a plurality of spherical organic microparticles, wherein the spherical organic microparticles are monodispersity and the average particle size thereof is less than the average particle size of the amorphous silica microparticles; wherein the amorphous silica microparticles form a concave-convex structure on the surface of the anti-glare layer having a plurality of irregular protrusions, and the linear roughness of the concave-convex structure has an arithmetic mean deviation Ra ranging from 0.2 to 1.0 μm and a mean spacing between peaks RSm ranging between 4 and 20 μm, wherein the Ra and RSm satisfy the relationship $2.0 < (Ra \times 100)/RSm < 10$, and the inclination angle (root mean square slope, RΔq) of the irregular protrusions is ranging between 15° and 50°.

In the present high-haze anti-glare film, the laser diffraction average particle size of the amorphous silica microparticles in the anti-glare layer is ranging between 3 and 10 μm and the BET specific surface area thereof is ranging between 60 and 100 $m^2/g$. In the present high-haze anti-glare film, the use amount of the amorphous silica microparticles is ranging between 6 and 25 parts by weight, and preferably ranging between 7 and 20 parts by weight per hundred parts by weight of the acrylate binder resin.

In the present high-haze anti-glare film, the spherical organic microparticles are monodispersity and the average particle size thereof is less than the average particle size of the amorphous silica microparticles, wherein the use amount of the spherical organic microparticles is ranging between 6 and 40 parts by weight, preferably between 10 and 38 parts by weight per hundred parts by weight of the acrylate binder resin, and the weight ratio of the spherical organic microparticles to the amorphous silica microparticles is not less than 0.3 and not more than 5, and preferably not less than 0.5 and not more than 4.5.

In the present high-haze anti-glare film, the thickness of the anti-glare layer is ranging between 2 and 10 μm.

Another aspect of the present invention is to provide a high-haze anti-glare anti-reflection film.

The high-haze anti-glare anti-reflection film disclosed in the present invention further comprises a low refractive layer formed on the anti-glare layer, which is used to provide an anti-reflection function and enhance the light transmittance, so as to increase the contrast in a darkroom, wherein the average reflectance at 5 degrees of the high-haze anti-glare film is not more than 0.15%, the average diffuse and specular reflectance of SCI (Specular Component Included) thereof is not more than 2.5%, and the average diffuse reflectance of SCE (Specular Component Excluded) thereof is not more than 2.5%.

The high-haze anti-glare anti-reflection film disclosed in the present invention further comprises a low refractive layer formed on the anti-glare layer, wherein the refractivity of the low refractive layer is not more than 1.4. The low refractive layer of the present high-haze anti-glare anti-reflection film comprises a binder resin, a plurality of hollow silica nanoparticles, and a leveling agent comprising a perfluoropolyether group-containing (meth)acrylic-modified organosilicone, wherein the binder resin in the low refractive layer is a (meth)acrylate resin or a fluoro-and-acrylic-modified polysiloxane resin.

The high-haze anti-glare anti-reflection film of the present invention provides a hydrophobic surface and the water contact angle thereof is more than 90°, and preferably more than 95°.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

Hereinafter, the parameters of the linear roughness used in the present invention is defined as below. The arithmetic mean deviation Ra refers to the arithmetic mean of the absolute values of ordinate $Z(x)$ within a sampling length; the maximum height Rz refers to the sum of the maximum profile peak height Zp and maximum profile valley depth Zv within a sampling length; the mean spacing between peaks RSm refers to the mean of the profile element width Xs within a sampling length; and the root mean square slope RΔq refers to the root mean square of the ordinate slope dz/dx within a sampling length. The parameters of the surface roughness used in the present invention is defined as below. The root mean square height Sq refers to the root mean square value of the $Z(x,y)$ within a defined area; the arithmetic mean height Sa refers the arithmetic mean of absolute coordinates $Z(x, y)$ within a defined area a defined area; the maximum height Sz refers to the sum of the maximum peak height Sp and maximum valley depth Sv within a defined area; and the root mean square gradient SΔq refers to the mean magnitude of the partial gradient (slope) of the surface.

The term "(meth)acrylate" used herein refers to acrylate or methacrylate.

The present invention is to provide a high-haze anti-glare film with a total haze not less than 40%, comprising a transparent substrate and an anti-glare layer formed on the transparent substrate, wherein the anti-glare layer comprising an acrylate binder resin, a plurality of amorphous silica microparticles and a plurality of spherical organic microparticles, wherein the spherical organic microparticles are monodispersity and the average particle size thereof is less than the average particle size of the amorphous silica microparticles. The present high-haze anti-glare film having an anti-glare layer with a concave-convex surface formed by the amorphous silica microparticles, because of the irregular protrusions formed by the irregular shapes of the amorphous silica microparticles, the lens effect of the surface can be effectively eliminated to reduce the sparkling phenomenon. Moreover, because the average particle size of the spherical organic microparticles is less than the average particle size of the amorphous silica microparticles, the spherical organic microparticles can increase the inner haze by increasing the internal scattering to prevent the pixel light source from directly going to the surface of the anti-glare film, and therefore, a high anti-glare property and less sparkling of the high-haze anti-glare film can be provided.

The present high-haze anti-glare film comprises a transparent substrate and an anti-glare layer formed on the transparent substrate, wherein the anti-glare layer comprises an acrylate binder resin, a plurality of amorphous silica microparticles and a plurality of spherical organic microparticles, and the total haze is the sum of the surface haze (Hs) and the inner haze (Hi) of the anti-glare film, and the inner haze (Hi) and the total haze (Ht) satisfy the relation 0.25<Hi/Ht<0.75, and preferably satisfy the relation 0.30<Hi/Ht<0.70.

The present high-haze anti-glare film comprises a transparent substrate and an anti-glare layer formed on the transparent substrate, wherein the anti-glare layer comprising an acrylate binder resin, a plurality of amorphous silica microparticles and a plurality of spherical organic microparticles, wherein the spherical organic microparticles are monodispersity and the average particle size thereof is less than the average particle size of the amorphous silica microparticles. The amorphous silica microparticles form a concave-convex surface having a plurality of irregular protrusions on the anti-glare layer, and the linear roughness of the concave-convex surface has an arithmetic mean deviation Ra ranging from 0.2 to 1.0 μm, preferably ranging from 0.3 to 0.8 μm, and a mean spacing between peaks RSm ranging between 4 and 20 μm, preferably ranging between 5 and 18 μm, wherein the Ra and RSm satisfy the relation 2.0<(Ra×100)/RSm<18, and the inclination angle (root mean square slope, RΔq) of the irregular protrusions is ranging between 15° and 50°.

The anti-glare layer of the present high-haze anti-glare film comprises the amorphous silica microparticles and the spherical organic microparticles with a smaller average particle size than the average particle size of the amorphous silica microparticles. Because the average particle size of the spherical organic microparticles is less than the average particle size of the amorphous silica microparticles, the surface roughness resulting from the less protrusions of the spherical organic microparticles can have a less mean of the profile element width and a more inclination angle of roughness curve, which represents an irregular shape. Thus, the present high-haze anti-glare film provides an anti-sparkling property resulting from eliminating the lens effect on the rough surface of the anti-glare layer. In a preferred embodiment of the present invention, the high-haze anti-glare film comprises a transparent substrate and an anti-glare layer formed on the transparent substrate, wherein the anti-glare layer comprising an acrylate binder resin, a plurality of amorphous silica microparticles and a plurality of spherical organic microparticles, wherein the spherical organic microparticles are monodispersity and the average particle size thereof is less than the average particle size of the amorphous silica microparticles. The amorphous silica microparticles form a concave-convex surface having a plurality of irregular protrusions on the anti-glare layer, and the linear roughness of the concave-convex surface has an arithmetic mean deviation Ra ranging from 0.3 to 0.8 µm, and a mean spacing between peaks RSm ranging between 5 and 18 µm, wherein the Ra and RSm satisfy the relationship 2.5<(Ra×100)/RSm<15, and the inclination angle (root mean square slope, RΔq) of the irregular protrusions is ranging between 20° and 45°.

In an embodiment of the present invention, the transparent substrate suitably used in the anti-glare film of the present invention can be the film with a good mechanical strength and light transmittance. The examples of the substrate can be but not limited to polyethylene terephthalate (PET), polyethylene naphthalate (PEN), polycarbonate (PC), triacetate cellulose (TAC), polyimide (PI), polyethylene (PE), polypropylene (PP), polyvinyl alcohol (PVA), polyvinyl chloride (PVC) or cyclic olefin copolymer (COC) and the like.

In a preferred embodiment of the high-haze anti-glare film of the present invention, the light transmittance of the transparent substrate is more than 80%, preferably more than 90%. The thickness of the transparent substrate is ranging between 10 µm and 500 µm, preferably ranging between 15 µm and 250 µm, and more preferably ranging between 20 µm and 100 µm.

In the high-haze anti-glare film of the present invention, the thickness of the anti-glare layer is ranging between 2 and 10 µm, and preferably ranging between 3 and 8 µm.

In the high-haze anti-glare film of the present invention, the amorphous silica microparticles comprised in the anti-glare layer have a laser diffraction average particle size of ranging between 3 and 10 µm, preferably ranging between 3 and 8 µm, and the BET specific surface area of ranging between 60 and 100 m²/g, preferably ranging between 65 and 90 m²/g.

In the present high-haze anti-glare film, the use amount of the amorphous silica microparticles is ranging between 6 and 25 parts by weight and preferably ranging between 7 and 20 parts by weight per hundred parts by weight of the acrylate binder resin.

In the high-haze anti-glare film of the present invention, the spherical organic microparticles are monodispersity, and the average particle size thereof is less than the average particle size of the amorphous silica microparticles, i.e., the spherical organic microparticles with an average particle size is less than 4 µm, such as 2.0 µm or 3.0 µm, can be used when the average particle size of the amorphous silica microparticles is 4.0 µm. The laser diffraction average particle size of the suitable spherical organic microparticles in the present invention is ranging between 2.0 and 8.0 µm. In the anti-glare layer, the use amount of the spherical organic microparticles is ranging between 6 and 40 parts by weight and preferably ranging between 10 and 38 parts by weight per hundred parts by weight of the acrylate binder resin. The spherical organic microparticles can provide the inner haze of the anti-glare layer for increasing the internal scattering to prevent the pixel light source of the panel from directly going to the surface of the anti-glare film, which may induce the lens effect, and therefore, the good image visibility of the display comprising the anti-glare film can be provided.

The suitable organic microparticles used in the present anti-glare layer is polymethyl methacrylate resin particles, polystyrene resin particles, styrene-methyl methacrylate copolymer particles, melamine particles, polyethylene resin particles, epoxy resin particles, polysiloxane resin particles, polyvinylidene fluoride resin particles or polyvinyl fluoride resin particles. The refractivity of the suitable organic microparticles is ranging between 1.40 and 1.70.

In the present high-haze anti-glare film, the use amount of the amorphous silica microparticles is ranging between 15 and 50 parts by weight and preferably ranging between 20 and 48 parts by weight per hundred parts by weight of the acrylate binder resin, the weight ratio of the spherical organic microparticles to the amorphous silica microparticles is not less than 0.3 and not more than 5.0 and preferably not less than 0.5 and not more than 4.5.

In the present high-haze anti-glare film, the linear roughness of the surface of the anti-glare layer has a maximum height Rz ranging between 3 to 15 µm, and the surface roughness thereof has an arithmetic mean deviation Sa ranging from 0.30 to 1.00 µm, a maximum height Sz ranging between 8 to 15 µm and a root mean square slope SΔq ranging between 0.30° and 1.5°.

The anti-glare layer of the present high-haze anti-glare film has a good abrasion resistance, therefore the anti-glare film can have a minor haze change after abrasion to provide an excellent durability.

In the anti-glare film of the present invention, the acrylate binder resin in the anti-glare layer comprises a (meth)acrylate composition and an initiator, wherein the (meth)acrylate composition comprises a 35 to 50 parts by weight of polypolyurethane (meth)acrylate oligomer with a functionality of 6 to 15, a 12 to 20 parts by weight of (meth)acrylate monomer with a functionality of 3 to 6 and a 1.5 to 12 parts by weight of (meth)acrylate monomer with a functionality less than 3.

In the preferred embodiment of the present invention, the suitable polypolyurethane (meth)acrylate oligomer with a functionality of 6 to 15 is a (meth)acrylate oligomer having a molecular weight of ranging between 1,500 and 4,500.

In the preferred embodiment of the present invention, the (meth)acrylate monomer with a functionality of 3 to 6 is a (meth)acrylate monomer having a molecular weight less than 800. The suitable (meth)acrylate monomer with a functionality of 3 to 6 can be, but not limited to, pentaerythritol triacrylate (PETA), dipentaerythritol hexaacrylate (DPHA), dipentaerythritol pentaacrylate (DPPA) or combinations thereof.

In the preferred embodiment of the present invention, the (meth)acrylate monomer with a functionality less than 3 is a (meth)acrylate monomer having a functionality of 1 or 2 and a molecular weight less than 500. The suitable (meth) acrylate monomer with a functionality less than 3 can be, but not limited to, 1,6-hexanediol diacrylate (HDDA), cyclic trimethylopropane formal acrylate (CTFA), 2-phenoxyethyl acrylate (PHEA), isobornyl acrylate (IBOA) or combinations thereof.

The suitable initiator used in the acrylic binder resin of the present invention can be selected from those commonly used in the related art, such as, for example, but not limited to, acetophenones-based initiator, diphenylketones-based initiator, propiophenones-based initiator, benzophenones-based initiator, bifunctional α-hydroxyketones-based initiator, acylphosphine oxides-based initiator and the like. The above-mentioned initiators can be used alone or in combination.

The anti-glare layer of the present high-haze anti-glare film can be added with a leveling agent to provide a good leveling and smoothness of the coated surface. The leveling agent used herein can optionally be a leveling agent with a recoatability, therefore the other optical function layers can be coated on the high-haze anti-glare film. The fluorine-based, (meth)acrylate-based or organosilicon-based leveling agents can be used in the present high-haze anti-glare film.

The other optical function layers can be optionally coated on the surface of the high-haze anti-glare film, such as a low refractive layer that can provide the anti-relection property.

In another aspect of the present invention, a high-haze anti-glare anti-reflection film is provided by further comprising a low refractive layer formed on the anti-glare layer of the high-haze anti-glare film to provide an anti-reflection function and enhance the light transmittance, so as to increase the contrast in a darkroom, wherein the average reflectance at 5 degrees of the high-haze anti-glare film a is not more than 0.15%, and the average diffuse and specular reflectance of SCI (Specular Component Included) thereof is not more than 2.5%, and the average diffuse reflectance of SCE (Specular Component Excluded) thereof is not more than 2.5%.

The present high-haze anti-glare anti-reflection film disclosed in the present invention further comprises a low refractive layer formed on the present anti-glare layer, wherein the low refractive layer comprises a binder resin, a plurality of hollow silica nanoparticles, and a leveling agent comprising a perfluoropolyether group-containing (meth) acrylic-modified organosilicone, wherein the refractivity of the low refractive layer is not more than 1.4.

In an embodiment of the present high-haze anti-glare anti-reflection film, the water contact angle thereof is more than 90°, and preferably more than 95°.

In an embodiment of the present high-haze anti-glare anti-reflection film, the average particle size of the hollow silica nanoparticles in the low refractive layer is ranging between 50 and 100 nm, and preferably ranging between 50 and 80 nm.

In an embodiment of the present high-haze anti-glare anti-reflection film, the binder resin in the low refractive layer is a (meth)acrylate resin or a fluoro-and-acrylic-modified polysiloxane resin.

In an embodiment of the present high-haze anti-glare anti-reflection film, the (meth)acrylate resin in the low refractive layer can be pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, ditrimethylolpropane tetra(meth)acrylate, dipentaerythritol tetra(meth)acrylate or the combination thereof. When the (meth) acrylate resin is used as the binder resin for the low refractive layer, the use amount of the hollow silica nanoparticles in the low refractive layer is ranging between 60 and 130 parts by weight and preferably ranging between 80 and 110 parts by weight per hundred parts by weight of the (meth) acrylate resin.

In an embodiment of the present high-haze anti-glare anti-reflection film, the fluoro-and-acrylic-modified polysiloxane resin can be used in the low refractive layer is a polysiloxane resin having a siloxane main chain, a branched chain containing a fluoroalkyl group, and a branched chain containing an acrylate functional group, with a number average molecular weight (Mn) less than 10,000, a fluorine content ranging between 1% and 15%, a refractive index ranging between 1.43 and 1.49, and the fluorine to silicon ratio ranging between 0.05 and 1.00. The suitable fluoro-and-acrylic-modified polysiloxane resin can be, but not limited to, for example, commercially available siloxane resin products, such as "X-12-2430C" manufactured by Shin-Etsu Chemical Co., Ltd., Japan. When the fluoro-and-acrylic-modified polysiloxane resin is used as the binder resin for the low refractive layer, a fluorinated polyurethane oligomer can be optionally further added into the low refractive layer. The suitable fluorinated polyurethane oligomer has a functionality of 2 to 6, a number average molecular weight (Mn) ranging between 1,000 and 20,000, a refractive index ranging between 1.30 and 1.45, viscosity at 25° C. less than 10,000 cps, and a fluorine content ranging between 20% and 60%. The suitable fluorinated polyurethane oligomer can be, but not limited to, for example, commercially available products, such as "LR6000" and "LR2000" manufactured by Miwon Specialty Chemical Co., Ltd., Korea. When the fluoro-and-acrylic-modified polysiloxane resin is used as the binder resin for the low refractive layer of the present high-haze anti-glare anti-reflection film, the use amount of the hollow silica nanoparticles in the low refractive layer is ranging between 90 and 350 parts by weight and preferably ranging between 100 and 300 parts by weight per hundred parts by weight of the fluoro-and-acrylic-modified polysiloxane resin.

In an embodiment of the present high-haze anti-glare anti-reflection film, the low refractive layer can further comprise a leveling agent. The leveling agent comprises a perfluoropolyether group-containing (meth)acrylic-modified organosilicone compound with a number average molecular weight (Mn) of ranging between 1,500 and 16,000. The suitable leveling agent comprising a perfluoropolyether group-containing (meth)acrylic-modified organosilicone compound can be, but not limited to, for example, commercially available products, such as "X-71-1203E", "KY-1203", "KY-1211" and "KY-1207" manufactured by Shin-Etsu Chemical Co., Ltd., Japan.

In the low refractive layer of the present high-haze anti-glare anti-reflection film, the use amount of the leveling agent varies with the type of binder resin used. When the (meth)acrylate resin is used as the binder resin for the low refractive layer, the use amount of the leveling agent is ranging between 5 and 20 parts by weight and preferably ranging between 9 and 17 parts by weight per hundred parts by weight of the (meth)acrylate resin. When the fluoro-and-acrylic-modified polysiloxane resin is used as the binder resin for the low refractive layer, the use amount of the leveling agent is ranging between 1 and 45 parts by weight and preferably ranging between 2 and 30 parts by weight per hundred parts by weight of the fluoro-and-acrylic-modified polysiloxane resin.

The suitable initiator used in the low refractive layer of the present high-haze anti-glare anti-reflection film can be, but not limited to, for example, commercially available products, such as "Esacure KIP-160", "Esacure One", "Omnirad 184", "Omnirad 907" and "Omnirad TPO" manufactured by IGM Resins B.V., Netherlands, and "TR-PPI-ONE" manufactured by Tronly Enterprise Co., Ltd., Hong Kong.

The low refractive layer can provide an anti-reflection function and improvement of the light transmittance to the present high-haze anti-glare anti-reflection film so as to increase the contrast of the film in a darkroom with maintaining of the anti-glare and anti-sparkling properties thereof, and the scratch resistance and the proper anti-fouling property of the surface can also be provided.

Another aspect of the present invention is to provide a method for preparing a high-haze anti-glare film. The method for preparing the anti-glare film of the present invention comprises the steps of mixing a (meth)acrylate composition comprises a polyurethane (meth)acrylate oligomer with a functionality of 6 to 15, at least one (meth)acrylate monomer with a functionality of 3 to 6, at least one (meth)acrylate monomer with functionality of less than 3, an initiator and adequate solvent(s) and stirred evenly for preparing an acrylate binder resin solution; adding a plurality of amorphous silica microparticles, a plurality of spherical organic microparticles, a leveling agent and adequate solvent(s) into the acrylate binder resin solution and stirring evenly for preparing an anti-glare solution; and coating the anti-glare solution on a transparent substrate, evaporating the solvent(s) and curing by radiation or electron beam for forming an anti-glare coating on the transparent substrate to obtain a high-haze anti-glare film.

The solvents suitable for preparation of the present anti-glare film can be the organic solvents commonly used in the related art, such as ketones, aliphatic, cycloaliphatic or aromatic hydrocarbons, ethers, esters or alcohols. The (meth)acrylate composition and the anti-glare solution can use one or one more organic solvents. The suitable solvent can be such as, but not limited to acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, cyclohexanol, diacetone alcohol, propylene glycol methyl ether acetate or tetrahydrofuran and the like.

In other embodiments of the present invention, other additives such as antistatic agents, colorants, flame retardants, ultraviolet absorbers, antioxidants, surface modifiers, silica nanoparticles with hydrophobic modification or defoaming agent can be added to the anti-glare solution as required.

The aforementioned anti-glare solution can be applied to the base film surface by any usual method in the related art, for example, bar coating, doctor blade coating, dip coating, roll coating, spinning coating, slot-die coating and the like.

A low refractive layer can be further applied on the high-haze anti-glare film disclosed in the present invention to provide the anti-reflection function and the improved light transmittance, therefore the contrast in a darkroom of the film can be enhanced with maintaining of the anti-glare and anti-sparkling properties thereof.

Another aspect of the present invention is to provide a method for preparing a high-haze anti-glare anti-reflection film, comprising the steps of mixing a binder resin, hollow silica nanoparticles, an initiator, a leveling agent and adequate solvent(s) and stirred evenly for preparing a low refractive solution; and coating the low refractive solution on a transparent substrate, evaporating the solvent(s) and curing by radiation or electron beam for forming an anti-glare coating on the transparent substrate to obtain a high-haze anti-glare anti-reflection film.

The solvents suitable for preparation of the aforementioned low refractive layer can be the organic solvents used in preparing the anti-glare coating. In other embodiments of the present invention, other additives such as antistatic agents, colorants, flame retardants, ultraviolet absorbers, antioxidants, surface modifiers, silica nanoparticles with hydrophobic modification or defoaming agent can be added to the low refractive solution as required. The low refractive solution can be coated by any usual method in the related art, for example, bar coating, doctor blade coating, dip coating, roll coating, spinning coating, slot-die coating and the like.

The present invention will be explained in further detail with reference to the examples. However, the present invention is not limited to these examples.

EXAMPLE

Preparation Example 1: Preparation of the Acrylate Binder Resin I 42 weight parts of polyurethane acrylate oligomer (functionality 6, molecular weight of about 2,600, viscosity of 70,000 cps (at 25° C.), commercially obtained from Miwon, Korea), 4.5 weight parts of PETA, 12 weight parts of DPHA, 3 weight parts of IBOA, 4 weight parts of photoinitiator (Chemcure-481, commercially obtained from Chembridge, Taiwan), 24.5 weight parts of ethyl acetate and 10 weight parts of n-butyl acetate were mixed and stirred for 1 hour to prepare the acrylate binder resin I.

Preparation Example 2: Preparation of the Acrylate Binder Resin II 42 weight parts of polyurethane acrylate oligomer (functionality 6, molecular weight of about 1,600, viscosity of 36,000 cps (at 25° C.), commercially obtained from IGM, Taiwan), 4.5 weight parts of PETA, 12 weight parts of DPHA, 3 weight parts of CTFA, 4 weight parts of photoinitiator (Chemcure-481, commercially obtained from Chembridge, Taiwan), 24.5 weight parts of ethyl acetate and 10 weight parts of n-butyl acetate were mixed and stirred for 1 hour to prepare the acrylate binder resin II.

Example 1: Preparation of the High-Haze Anti-Glare Film 200 weight parts of acrylate binder resin I, 16.5 weight parts of amorphous silica microparticles (Nipsil® SS-50B, average particle size 4 µm, BET specific surface area 80 m$^2$/g, commercially obtained from Tosoh Silica Co.), 16.5 weight parts of spherical polystyrene microparticles (XX-40IK, average particle size 3 µm, available from Sekisui Plastics Co. Ltd., Japan), 2.2 weight parts of dispersant (DisperBYK-2150, solid content 5%, solvent: Propylene glycol methyl ether acetate/n-butyl acetate, commercially obtained from BYK, Germany), 13 weight parts of polyether-modified polydimethylsiloxane leveling agent (BYK-333, solid content 10%, solvent: n-butyl acetate, commercially obtained from BYK, Germany), 65 weight parts of ethyl acetate and 160 weight parts of n-butyl acetate were mixed and stirred to prepare the anti-glare coating solution. The resulting anti-glare coating solution was coated on a triacetyl cellulose (TAC) film with a thickness of 60 µm. After the coating layer was dried, the layer was cured by exposure to UV light in a cumulative dosage of 300 mJ/cm² under nitrogen atmosphere. Thus, a high-haze anti-glare film comprising an anti-glare layer with a thickness of 6.7 μm formed on the substrate was obtained.

The properties of the obtained high-haze anti-glare film were determined in accordance with the optical and physical properties measurement described hereinafter, and the test results were shown in Table 1 to Table 3.

Haze measurement: The haze was measured according to the test method of JIS K7136 by NDH-2000 Haze Meter (manufactured by Nippon Denshoku Industries, Japan).

Inner haze and surface haze measurement: The anti-glare films adhered to a TAC substrate (T40UZ, thickness 40 μm, available from Fujifilm, Japan) with transparent optical adhesive, flattening the uneven surface of the anti-glare film. In this state, the haze of prepared sample was measured according to the test method of JIS K7136 by NDH-2000 Haze Meter was the inner haze, and the surface haze could be obtained from the total haze deducted the inner haze.

Light transmittance measurement: The light transmittance was measured according to the test method of JIS K7361 by NDH-2000 Haze Meter.

Gloss measurement: The gloss of the anti-glare films was obtained by adhering the anti-glare films to a black acrylic plate and measuring the gloss thereof according to the test method of JIS Z8741 by BYK Micro-Gloss gloss meter at viewing angles of 20, 60 and 85 degrees.

Clarity measurement: Measuring the anti-glare film according to the test method of JIS K7374 by SUGA ICM-IT image clarity meter, and the sum of the measured values at slits of 0.125 mm, 0.25 mm, 0.50 mm, 1.00 mm and 2.00 mm was the clarity.

Degree of hardness test: The degree of hardness was tested according to the test method of JIS K5400. By 553-M automatic pencil hardness tester (manufactured by Yasuda Seiki Seisakusho, Japan), the Mitsubishi standard hardness pencils with several kinds of hardness from low to high were respectively moved 5 times with a load of 500 g and a speed of 1 mm/sec on the anti-glare film. The maximum hardness of the pencil made less than 2 scratches on the film surface was recorded as the degree of hardness of the anti-glare film.

Abrasion resistance test: The surfaces of the anti-glare films were rubbed back and forth by Bon Star steel wool #0000 for 10 times at a speed of 60 rpm, and the number of the made scratches on the film surface was counted. The result was evaluated by the evaluation criteria shown as below.

Extremely excellent (marked as ⊚): No scratches were found on the surface;

Excellent (marked as ○): 1 to 4 scratches were found on the surface;

Mediocre (marked as Δ): 5 to 14 scratches were found on the surface;

Poor (marked as ×): 15 or more scratches were found on the surface.

Haze change after abrasion: The surfaces of the anti-glare films were rubbed back and forth by a 4 cm² friction head with Bon Star steel wool #0000 for 50 times at a load of 500 g and a speed of 30 rpm. The haze was measured according to the test method of JIS K7136 by NDH-2000 Haze Meter, and the haze change after abrasion test could be calculated.

Anti-glare evaluation: The anti-glare films were adhered to a black acrylic plate, and the surfaces of the prepared samples were illuminated by 2 fluorescent tubes to check the status of reflected by observation. The evaluation criteria were as below.

Lv.1: Two separate fluorescent tubes could be seen clearly and the straight outlines of tubes was distinguished obviously;

Lv.2: Two separate fluorescent tubes could be seen clearly, but the outlines of tubes were slightly fuzzy;

Lv.3: Two separate fluorescent tubes could be seen, and although the outlines of tubes were fuzzy but the shapes of tubes could be distinguished;

Lv.4: It could be seen that there were 2 fluorescent tubes, but the shapes of tubes could not be distinguished;

Lv.5: It could not be seen that there were 2 fluorescent tubes and the shapes of tubes could not be distinguished.

Roughness measurement: The anti-glare film was adhered to a black acrylic plate with transparent optical adhesive, forming a sample, and the sample was photographed four 3D surface roughness images with an area of 640×640 μm² by OLYMPUS LEXT OLS5000-SAF 3D laser conjugate focus microscope arranging a MPLAPON20×LEXT objective lens. The root mean square height (Sq), the arithmetic mean height (Sa), the maximum height (Sz) and the root mean square gradient (SΔq) of the anti-glare film could be measured according to the description of surface roughness of ISO 25178-2:2012; the arithmetic mean deviation (Ra), the maximum height (Rz), the mean spacing between peaks (RSm) and the root mean square slope (RΔq) of the anti-glare film could be measured according to the description of linear roughness of ISO 4287:1997, and each item was tested for 5 times and the average was taken.

Anti-sparkling property evaluation: The anti-glare film was respectively adhered to a BenQ EW 2780U display (163 PPI) and an Apple iPad 4 display (264 PPI) with transparent optical adhesive, then the green display state was set for full screen of the liquid-crystal displays and the sparkle could be evaluated by visual observation from a vertical distance of 50 cm from the surface of the screen. If there was no sparkle, the evaluation was "extremely excellent" (marked as ⊚); if there was a slight sparkle but not obvious, and the display quality was not affected, the evaluation was "excellent" (marked as ○); if there was an obvious sparkle, but the display quality was acceptable, the evaluation was "medium" (marked as Δ); if there was an obvious sparkle and the display quality was seriously affected, the evaluation was "poor" (marked as ×).

Example 2: Preparation of the High-Haze Anti-Glare Film

The high-haze anti-glare film was prepared in the same manner as in Example 1, except that the amount of the spherical polystyrene microparticles (XX-40IK) was 24.8 weight parts, and the thickness of the anti-glare layer was 6.5 μm.

The optical and physical properties of the high-haze anti-glare film obtained from Example 2 were determined in the same manners as in Example 1, and the test results were shown in Table 1 to Table 3.

Example 3: Preparation of the High-Haze Anti-Glare Film

The high-haze anti-glare film was prepared in the same manner as in Example 1, except that the amount of the amorphous silica microparticles (Nipsil® SS-50B) was 20 weight part, and the thickness of the anti-glare layer was 6.7 μm.

The optical and physical properties of the high-haze anti-glare film obtained from Example 3 was determined in the same manners as in Example 1, and the test results were shown in Table 1 to Table 3.

Example 4: Preparation of the High-Haze Anti-Glare Film

The high-haze anti-glare film was prepared in the same manner as in Example 3, except that the amount of the spherical polystyrene microparticles (XX-40IK) was 24.8 weight parts, and the thickness of the anti-glare layer was 6.4 μm.

The optical and physical properties of the high-haze anti-glare film obtained from Example 4 were determined in the same manners as in Example 1, and the test results were shown in Table 1 to Table 3.

Example 5: Preparation of the High-Haze Anti-Glare Film

The high-haze anti-glare film was prepared in the same manner as in Example 1, except that the acrylate binder resin was acrylate binder resin II, and the spherical polystyrene microparticles (SSX-302ABE, average particle size 2.0 μm, available from Sekisui Plastics Co. Ltd., Japan) was used, and the thickness of the anti-glare layer was 6.4 μm.

The optical and physical properties of the high-haze anti-glare film obtained from Example 5 were determined in the same manners as in Example 1, and the test results were shown in Table 1 to Table 3.

Example 6: Preparation of the High-Haze Anti-Glare Film 200 weight parts of acrylate binder resin I, 14.4 weight parts of amorphous silica microparticles (Nipsil® SS-50B), 33.0 weight parts of spherical polystyrene microparticles (XX-40IK), 2.2 weight parts of dispersant (DisperBYK-2150), 13 weight parts of polyether-modified polydimethylsiloxane leveling agent (BYK-UV3535, solid content 10%, solvent: n-butyl acetate, commercially obtained from BYK, Germany), 90 weight parts of ethyl acetate and 160 weight parts of n-butyl acetate were mixed and stirred to prepare the anti-glare coating solution. The resulting anti-glare coating solution was coated on a TAC film with a thickness of 60 μm. After the coating layer was dried, the layer was cured by exposure to UV light in a cumulative dosage of 300 mJ/cm² under nitrogen atmosphere. Thus, a high-haze anti-glare film comprising an anti-glare layer with a thickness of 5.8 μm formed on the substrate was obtained.

The optical and physical properties of the high-haze anti-glare film obtained from Example 6 were determined in the same manners as in Example 1, and the test results were shown in Table 1 to Table 3.

Example 7: Preparation of the High-Haze Anti-Glare Film

The high-haze anti-glare film was prepared in the same manner as in Example 6, except that the amount of the amorphous silica microparticles (Nipsil SS-50B) was 10.3 weight parts and 8 weight parts of the dispersant DisperBYK-3650 (solid content 31%, solvent: propylene glycol monomethyl ether acetate/propylene glycol monomethyl ether, commercially obtained from BYK, Germany) was used instead of dispersion DisperBYK-2150, and the thickness of the anti-glare layer was 6.4 μm.

The optical and physical properties of the high-haze anti-glare film obtained from Example 7 were determined in the same manners as in Example 1, and the test results were shown in Table 1 to Table 3.

Example 8: Preparation of the High-Haze Anti-Glare Film

The high-haze anti-glare film was prepared in the same manner as in Example 1, except that the amount of the spherical polystyrene microparticles (XX-40IK) was 8.3 weight parts, and thickness of the anti-glare layer was 6.6 μm.

The optical and physical properties of the high-haze anti-glare film obtained from Example 8 were determined in the same manners as in Example 1, and the test results were shown in Table 1 to Table 3.

As shown in Table 1, the high-haze anti-glare films obtained from Example 1 to 8 showed an excellent anti-glare property and a superior anti-sparkling property at high PPI.

TABLE 1

The optical test results of the anti-glare films obtained from Examples 1 to 8

| | Total Haze (%) | Inner haze (%) | Surface haze (%) | Light Transmittance (%) | Gloss (%) | | | Clarity (%) | Anti-glare | Anti-sparkling Property | |
|---|---|---|---|---|---|---|---|---|---|---|---|
| | | | | | 20 degrees | 60 degrees | 85 degrees | | | 163 PPI | 264 PPI |
| Example 1 | 77.42 | 31.95 | 45.47 | 93.04 | 0.4 | 5.7 | 27.7 | 16.2 | Lv.5 | ○ | ○ |
| Example 2 | 75.25 | 32.13 | 43.12 | 92.84 | 0.4 | 5.8 | 28.4 | 16.7 | Lv.5 | ◎ | ◎ |
| Example 3 | 86.04 | 34.14 | 51.90 | 93.84 | 0.1 | 2.4 | 19.9 | 25.5 | Lv.5 | ◎ | ◎ |
| Example 4 | 89.54 | 41.78 | 47.76 | 93.04 | 0.1 | 2.0 | 22.4 | 34.1 | Lv.5 | ◎ | ◎ |
| Example 5 | 86.91 | 40.75 | 46.16 | 93.42 | 0.1 | 2.5 | 22.3 | 28.3 | Lv.5 | ◎ | ◎ |
| Example 6 | 93.78 | 47.00 | 46.78 | 93.60 | 0.3 | 4.5 | 26.4 | 22.7 | Lv.5 | ◎ | ◎ |
| Example 7 | 77.41 | 42.23 | 35.18 | 93.26 | 0.5 | 8.3 | 35.1 | 16.2 | Lv.5 | ◎ | ◎ |
| Example 8 | 65.63 | 18.19 | 47.44 | 91.96 | 0.6 | 7.9 | 28.3 | 13.6 | Lv.5 | ○ | ○ |

The roughnesses of the high-haze anti-glare films obtained from Example 1 to 8 were determined and the results were shown in Table 2. In the anti-glare films obtained from Examples 1 to 8, the concave-convex surface having a plurality of irregular protrusions with a smaller average peak spacing formed on the anti-glare layer can further enhance the anti-sparkling property.

TABLE 2

The roughness of the anti-glare films obtained from Examples 1 to 8

| | Linear roughness | | | | Surface Roughness | | | |
|---|---|---|---|---|---|---|---|---|
| Example | Arithmetic Mean Deviation Ra (μm) | Maximum Height Rz (μm) | Mean Spacing Between Peaks RSm (μm) | Root Mean Square Slope RΔq (°) | Root Mean Square Height Sq (μm) | Arithmetic Mean Height Sa (μm) | Maximum Height Sz (μm) | Root Mean Square Gradient SΔq (°) |
| Example 1 | 0.41 | 3.71 | 11.7 | 23.4 | 0.58 | 0.45 | 11.13 | 0.63 |
| Example 2 | 0.46 | 4.63 | 10.9 | 26.5 | 0.58 | 0.44 | 10.3 | 0.66 |
| Example 3 | 0.54 | 4.79 | 7.8 | 33.9 | 0.71 | 0.56 | 12.23 | 0.95 |
| Example 4 | 0.66 | 5.74 | 6.8 | 41.6 | 0.81 | 0.65 | 11.02 | 1.18 |
| Example 5 | 0.56 | 4.92 | 6.7 | 36.9 | 0.74 | 0.59 | 10.84 | 1.12 |
| Example 6 | 0.52 | 4.44 | 8.5 | 31.7 | 0.7 | 0.55 | 11.67 | 0.93 |
| Example 7 | 0.39 | 3.86 | 12.5 | 21.8 | 0.53 | 0.41 | 8.74 | 0.59 |
| Example 8 | 0.4 | 4.23 | 17.3 | 18.7 | 0.54 | 0.41 | 10.99 | 0.52 |

The degree of hardness, abrasion resistance and haze change after abrasion of the high-haze anti-glare films obtained from Example 1 to 8 were measured and the results were shown in Table 3. The high-haze anti-glare films obtained from Example 1 to 8 showed an excellent hardness, abrasion resistance and a less haze change after abrasion.

TABLE 3

The surface condition of the anti-glare films obtained from Examples 1 to 8

| Examples | Degree of Hardness | Number of Scratches After 500 g Abrasion | Abrasion Resistance Evaluation | Haze Change After Abrasion |
|---|---|---|---|---|
| Example 1 | 2H | 0 | ◎ | −0.25 |
| Example 2 | 2H | 0 | ◎ | −0.50 |
| Example 3 | 2H | 0 | ◎ | −0.35 |
| Example 4 | 2H | 0 | ◎ | −0.24 |
| Example 5 | 2H | 0 | ◎ | 1.23 |
| Example 6 | 2H | 0 | ◎ | 2.07 |
| Example 7 | 2H | 0 | ◎ | 2.77 |
| Example 8 | 2H | 0 | ◎ | −0.43 |

Example 9: Preparation of the High-Haze Anti-Glare Anti-Reflection Film

A low refractive solution I was prepared. 42.6 weight parts of fluoro-and-acrylic-modified polysiloxane resin (X-12-2430C, commercially obtained from Shin-Etsu Chemical, Japan), 42.6 weight parts of fluorinated polyurethane oligomer (LR6000, commercially obtained from Miwon Specialty Chemical Co., Ltd., Korea), 5.6 weight parts of photoinitiator (KIP-160, commercially obtained from IGM Resin, Netherland), 61.1 weight parts of a perfluoropolyether group-containing (meth)acrylic-modified organosilicone (X-71-1203E, solid content 20%, solvent: methyl isobutyl ketone, commercially obtained from Shin-Etsu Chemical, Japan), 524 weight parts of hollow silica nanoparticles dispersion (Thrulya 4320, solid content 20%, average particle particle size 60 nm, solvent: methyl isobutyl ketone, commercially obtained from JGC Catalysts and Chemicals, Japan) and 7194 weight parts of ethyl acetate were mixed evenly to prepare a low refractive solution I.

A high-haze anti-glare film 3-1 was prepared in the same manner as in Example 3, except that the leveling agent with a recoatability (BYK-UV3535, solid content 10%, solvent: n-butyl acetate, commercially obtained from BYK, Germany) was used instead of the leveling agent BYK-333.

The low refractive solution I was coated on the high-haze anti-glare film 3-1. After the coating layer was dried at 80° C., the layer was cured by exposure to UV light in a cumulative dosage of 300 mJ/cm$^2$ under nitrogen atmosphere. Thus, an anti-glare anti-reflection film comprising a low refractive layer with a thickness of 0.13 μm formed on the high-haze anti-glare film was obtained.

The optical properties and surface condition of the obtained high-haze anti-glare anti-reflection film were determined in the same manners as in Example 1, and the results were shown in Table 4.

Reflectance measurement: The high-haze anti-glare film was adhered to a black acrylic plate with adhesive, forming a sample, and the average reflectance of 5 degrees, the minimum diffuse and specular reflectance of SCI, the average diffuse and specular reflectance of SCI and the average reflectance of diffuse reflectance of SCE of the sample were measured by HITACHI U-4150 spectrometer in a wavelength range of 380-780 nm.

Water contact angle measurement: The high-haze anti-glare film was adhered to the test carrier with adhesive, and water contact angle was measured by the Surface Electro Optics (SEO) Phoenix-150 contact angle meter, adding a drop of about 0.01 mL of water each time.

Example 10: Preparation of the High-Haze Anti-Glare Anti-Reflection Film

A low refractive solution II was prepared. 85.2 weight parts of fluoro-and-acrylic-modified polysiloxane resin (X-12-2430C), 5.6 weight parts of photoinitiator (KIP-160), 61.1 weight parts of a perfluoropolyether group-containing (meth)acrylic-modified organosilicone (X-71-1203E), 524 weight parts of hollow silica nanoparticles dispersion (Thrulya 4320), 3595 weight parts of ethyl acetate and 3595 weight parts of propylene glycol methyl ether acetate were mixed evenly to prepare a low refractive solution II.

A high-haze anti-glare film 5-1 was prepared in the same manner as in Example 5, except that the leveling agent with a recoatability (BYK-UV3535, solid content 10%, solvent: n-butyl acetate, commercially obtained from BYK, Germany) was used instead of the leveling agent BYK-333. The low refractive solution II was coated on the high-haze anti-glare film 5-1 to form a high-haze anti-glare anti-reflection film.

The optical properties and surface condition of the obtained high-haze anti-glare anti-reflection film were determined in the same manners as in Example 9, and the results were shown in Table 4.

Example 11: Preparation of the High-Haze Anti-Glare Anti-Reflection Film

The low refractive solution II was prepared in the same manner as in Example 10. The low refractive solution II was coated on the anti-glare layer of the high-haze anti-glare film obtained from Example 6, after the coating layer was dried at 80° C., the layer was cured by exposure to UV light in a cumulative dosage of 300 mJ/cm$^2$ under nitrogen atmosphere, to form a high-haze anti-glare anti-reflection film. The optical properties and surface condition of the obtained high-haze anti-glare anti-reflection film were determined in the same manners as in Example 9, and the results were shown in Table 4.

Example 12: Preparation of the High-Haze Anti-Glare Anti-Reflection Film

The low refractive solution II was prepared in the same manner as in Example 10. The low refractive solution II was coated on the anti-glare layer of the high-haze anti-glare film obtained from Example 7, after the coating layer was dried at 80° C., the layer was cured by exposure to UV light in a cumulative dosage of 300 mJ/cm$^2$ under nitrogen atmosphere, to form a high-haze anti-glare anti-reflection film.

The optical properties and surface condition of the obtained high-haze anti-glare anti-reflection film were determined in the same manners as in Example 9, and the results were shown in Table 4.

The optical properties and surface condition of the high-haze anti-glare anti-reflection films obtained from Example 9 to 12 were determined and the results are shown in Table 4, wherein the average reflectance of 5 degrees thereof were lowered to 0.02% to 0.07% and the average reflectance of SCI thereof were ranging between 1.78% and 2.19%, providing an excellent anti-reflection function to the high-haze anti-glare anti-reflection films.

After a low refractive layer applied on the present high-haze anti-glare film, the average reflectance of 5 degrees of the coated high-haze anti-glare film were lowered to 0.02% to 0.07% and the average reflectance of SCI thereof are ranging between 1.78% and 2.19%, which can furtherly provide an anti-reflection function to the present high-haze anti-glare film and maintain the anti-glare and anti-sparkling properties thereof.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A high-haze anti-glare film, comprising:
a transparent substrate; and
a cured anti-glare layer formed on the transparent substrate, wherein the cured anti-glare layer is formed by curing a composition comprising an acrylate binder resin, a plurality of amorphous silica microparticles and a plurality of spherical organic microparticles, wherein the spherical organic microparticles are monodispersity, and the an average particle size thereof is less than an average particle size of the amorphous silica microparticles;
wherein the amorphous silica microparticles form a concave-convex surface having a plurality of irregular protrusions on the cured anti-glare layer, and the concave-convex surface has an arithmetic mean deviation Ra ranging from 0.2 to 1.0 μm and a mean spacing between peaks RSm ranging between from 4 to 20 μm, wherein the Ra and RSm satisfy the relation 2.0<(Ra×100)/RSm<18, and an inclination angle (root mean square slope, RΔq) of the irregular protrusions ranges from 15° and to 50°;
wherein the a total haze (Ht) of the high-haze anti-glare film is more than 40%, and the total haze is the sum of a surface haze (Hs) and an inner haze (Hi) of the

TABLE 4

The optical properties and surface condition of the high-haze anti-glare anti-reflection films obtained from Examples 9 to 12

| Example | | Example 9 | Example 10 | Example 11 | Example 12 |
|---|---|---|---|---|---|
| Total Haze (%) | | 80.87 | 82.96 | 80.77 | 73.72 |
| Inner haze (%) | | 36.29 | 41.05 | 46.04 | 42.13 |
| Surface Haze (%) | | 44.58 | 41.91 | 34.73 | 31.59 |
| Light Transmittance (%) | | 95.37 | 95.41 | 95.79 | 94.28 |
| Gloss (%) | 20 degrees | 0.1 | 0.1 | 0.1 | 0.4 |
| | 60 degrees | 2.4 | 2.5 | 3.1 | 7.7 |
| | 85 degrees | 24.4 | 27.6 | 29.3 | 36.5 |
| Clarity (%) | | 20.2 | 22.8 | 19.3 | 15.9 |
| Anti-glare Property | | Lv.5 | Lv.5 | Lv.5 | Lv.5 |
| Average Reflectance of 5 Degrees (%) | | 0.02 | 0.03 | 0.04 | 0.07 |
| Minimum Diffuse and Specular Reflectance of SCI (%) | | 1.91 | 2.1 | 1.93 | 1.74 |
| Average Diffuse and Specular Reflectance of SCI (%) | | 2.05 | 2.19 | 2.01 | 1.78 |
| Average Diffuse Reflectance of SCE (%) | | 2.03 | 2.16 | 1.97 | 1.71 |
| Water Contact Angle (°) | | 106.8 | 103.6 | 105 | 98.5 |
| Anti-sparkling property | 163 PPI | ◎ | ◎ | ◎ | ◎ |
| | 264 PPI | ◎ | ◎ | ◎ | ○ | high-haze anti-glare film, and the inner haze (Hi) and the total haze (Ht) satisfy the relation 0.25<Hi/Ht<0.75.

2. The high-haze anti-glare film as claimed in claim 1, wherein the amorphous silica microparticles in the cured anti-glare layer has a laser diffraction average particle size ranging from 3 to 10 μm and a BET specific surface area ranging from 60 to 100 m²/g.

3. The high-haze anti-glare film as claimed in claim 1, wherein the laser diffraction average particle size of the amorphous silica microparticles in the cured anti-glare layer ranges from 2 to 8 μm.

4. The high-haze anti-glare film as claimed in claim 1, wherein a use amount of the amorphous silica microparticles ranges from 6 to 25 parts by weight per hundred parts by weight of the acrylate binder resin.

5. The high-haze anti-glare film as claimed in claim 4, wherein the use amount of the amorphous silica microparticles ranges from 7 to 20 parts by weight per hundred parts by weight of the acrylate binder resin.

6. The high-haze anti-glare film as claimed in claim 1, wherein a use amount of the spherical organic microparticles ranges from 6 to 40 parts by weight per hundred parts by weight of the acrylate binder resin.

7. The high-haze anti-glare film as claimed in claim 6, wherein the use amount of the spherical organic microparticles ranges from 10 to 38 parts by weight per hundred parts by weight of the acrylate binder resin.

8. The high-haze anti-glare film as claimed in claim 1, wherein a total use amount of the amorphous silica microparticles and the spherical organic microparticles ranges from 15 and to 50 parts by weight per hundred parts by weight of the acrylate binder resin.

9. The high-haze anti-glare film as claimed in claim 1, wherein a weight ratio of the spherical organic microparticles to the amorphous silica microparticles is not less than 0.3 and not more than 5.

10. The high-haze anti-glare film as claimed in claim 1, wherein a thickness of the anti-glare layer ranges from 2 to 10 μm.

11. A high-haze anti-glare anti-reflection film, comprising the high-haze anti-glare film as claimed in claim 1 and a cured low refractive layer formed on the cured anti-glare layer of the high-haze anti-glare anti-reflection film, wherein an average reflectance at 5 degrees of the high-haze anti-glare film is not more than 0.15%, and an average diffuse and specular reflectance of SCI (Specular Component Included) thereof is not more than 2.5%, and an average diffuse reflectance of SCE (Specular Component Excluded) thereof is not more than 2.5%.

12. The high-haze anti-glare anti-reflection film as claimed in claim 11, wherein a refractivity of the cured low refractive layer is not more than 1.4.

13. The high-haze anti-glare anti-reflection film as claimed in claim 11, wherein the cured low refractive layer is formed by curing a composition comprising a binder resin, a plurality of hollow silica nanoparticles, and a leveling agent comprising a perfluoropolyether group-containing (meth)acrylic-modified organosilicone.

14. The high-haze anti-glare anti-reflection film as claimed in claim 13, wherein the binder resin in the cured low refractive layer is a (meth)acrylate resin or a fluoro-and-acrylic-modified polysiloxane resin.

15. The high-haze anti-glare anti-reflection film as claimed in claim 11, wherein a water contact angle thereof is more than 90°.

* * * * *